United States Patent
Kela et al.

(10) Patent No.: US 10,454,628 B2
(45) Date of Patent: Oct. 22, 2019

(54) METHODS AND NODES IN A WIRELESS COMMUNICATION SYSTEM

(71) Applicant: Huawei Technologies Co., Ltd., Shenzhen (CN)

(72) Inventors: Petteri Kela, Helsinki (FI); Yinggang Du, Shenzhen (CN); Johan Christer Qvarfordt, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 80 days.

(21) Appl. No.: 15/625,803

(22) Filed: Jun. 16, 2017

(65) Prior Publication Data

US 2017/0288820 A1  Oct. 5, 2017

Related U.S. Application Data

(63) Continuation of application No. PCT/EP2014/077940, filed on Dec. 16, 2014.

(51) Int. Cl.
*H04L 1/18* (2006.01)

(52) U.S. Cl.
CPC .......... *H04L 1/1845* (2013.01); *H04L 1/1874* (2013.01); *H04L 1/1887* (2013.01); *H04L 1/1848* (2013.01)

(58) Field of Classification Search
CPC ... H04L 1/1845; H04L 1/1874; H04L 1/1887; H04L 1/1848
See application file for complete search history.

(56) References Cited

U.S. PATENT DOCUMENTS

2005/0138530 A1* 6/2005 Huang .................... H03M 7/30
                                                       714/774
2005/0235190 A1* 10/2005 Miyazaki .............. H04L 1/1812
                                                       714/748
(Continued)

FOREIGN PATENT DOCUMENTS

CN     101282202 A     10/2008
CN     101350704 A     1/2009
(Continued)

OTHER PUBLICATIONS

"Draft LS Reply on NDI vs. RV," 3GPP TSG-RAN WG1#51bis Sevilla, Spain, R1-080438, 3rd Generation Partnership Project, Valbonne, France (Jan. 14-18, 2008).
(Continued)

*Primary Examiner* — Will W Lin
(74) *Attorney, Agent, or Firm* — Leydig, Voit & Mayer, Ltd.

(57) ABSTRACT

A transmitter, a receiver and a method for communicating data packets. The method comprises receiving a data packet and determining if it is a re- or new transmission; and, when it is a retransmission: combining the received data packet with oldest unsuccessfully decoded data packet stored in a second memory, and decoding the combined data packet; when it is a new transmission: decoding the received data packet; checking if the decoding is successful; deleting the oldest stored data packet in the first memory; storing the decoded data packet in the first memory when the decoding is successful or storing the decoded data packet in the second memory when the decoding is not successful; and transmitting feed-back information to the transmitter.

8 Claims, 11 Drawing Sheets

(56) References Cited

U.S. PATENT DOCUMENTS

| | | |
|---|---|---|
| 2009/0024896 A1 | 1/2009 | Tseng |
| 2011/0154143 A1* | 6/2011 | Eckert .................. H04L 1/1812 714/748 |
| 2011/0179332 A1* | 7/2011 | Ryden .................. H04L 1/1607 714/751 |
| 2013/0215941 A1 | 8/2013 | Cho et al. |
| 2013/0262952 A1* | 10/2013 | Hahm ............... H03M 13/2957 714/751 |
| 2013/0336299 A1* | 12/2013 | Lee ....................... H04L 5/0007 370/336 |
| 2014/0006890 A1* | 1/2014 | Liberg ................. H04L 1/1812 714/748 |
| 2014/0086302 A1 | 3/2014 | Felix et al. |
| 2016/0050049 A1* | 2/2016 | Yang .................... H04L 1/1812 370/329 |

FOREIGN PATENT DOCUMENTS

| | | |
|---|---|---|
| CN | 102142945 A | 8/2011 |
| CN | 103684680 A | 3/2014 |
| CN | 103916224 A | 7/2014 |
| EP | 2451107 A1 | 5/2012 |
| WO | 2012060559 A1 | 5/2012 |

OTHER PUBLICATIONS

Zhou et al., "Contention based access for machine-type communications over LTE," VTC 2012—Spring, IEEE 75th Vehicular Technology Conference, Institute of Electrical and Electronics Engineers, New York, New York (2012).

Mogensen et al., "5G small cell optimized radio design," Globecom 2013 workshop—Emerging Technologies LTE—Advanced and Beyond 4G, pp. 111-116, Institute of Electrical and Electronics Engineers, New York, New York (Dec. 2013).

Tullberg, "METIS Concepts for 5G," 5G PPP Information day, pp. 1-13, (Apr. 28, 2014).

* cited by examiner

|    | 0 | 1   | 2   | 3    | 4    | 5    | 6   | 7 | 8    | 9 | 10 | 11 |
|----|---|-----|-----|------|------|------|-----|---|------|---|----|----|
| UL |   |     |     | 1ACK | 2ACK | 3ACK |     |   | 4ACK |   |    |    |
| DL |   | 1DL | 2DL | 3DL  |      |      | 4DL |   |      |   |    |    |

Fig. 2A

|    | 0 | 1   | 2   | 3    | 4    | 5    | 6 | 7    | 8 | 9    | 10 | 11 |
|----|---|-----|-----|------|------|------|---|------|---|------|----|----|
| UL |   |     |     | 1ACK | 2NAK | 3ACK |   |      |   | 2ACK |    |    |
| DL |   | 1DL | 2DL | 3DL  |      |      |   | 2RTX |   |      |    |    |

Fig. 2B

|    | 0 | 1   | 2   | 3    | 4    | 5    | 6    | 7    | 8 | 9    | 10 | 11   |
|----|---|-----|-----|------|------|------|------|------|---|------|----|------|
| UL |   |     |     | 1ACK | 2NAK | 3NAK | 4ACK | 1ACK |   | 2ACK |    | 3ACK |
| DL |   | 1DL | 2DL | 3DL  | 4DL  | 1DL  |      | 2RTX |   | 3RTX |    |      |

Fig. 3A

|    | 0 | 1   | 2   | 3    | 4    | 5    | 6    | 7    | 8   | 9    | 10  | 11   |
|----|---|-----|-----|------|------|------|------|------|-----|------|-----|------|
| UL |   |     |     | 1ACK | 2NAK | 3ACK | 4ACK | 1ACK |     | 2NAK |     | 4ACK |
| DL |   | 1DL | 2DL | 3DL  | 4DL  | 1DL  |      | 2RTX | 3DL | 4DL  | 1DL |      |

1ACK
2RTX

Fig. 3B

|    | 0 | 1   | 2   | 3      | 4    | 5    | 6    | 7    | 8    | 9    | 10   | 11   |
|----|---|-----|-----|--------|------|------|------|------|------|------|------|------|
| UL |   |     |     | 1error | 2NAK | 3ACK | 4ACK |      |      | 1ACK | 2ACK | 3ACK |
| DL |   | 1DL | 2DL | 3DL    | 4DL  |      |      | 1RTX | 2RTX | 3DL  | 4DL  | 1DL  |

Fig. 3C

|    | 0 | 1   | 2    | 3    | 4   | 5    | 6    | 7    | 8    | 9    | 10   | 11   |
|----|---|-----|------|------|-----|------|------|------|------|------|------|------|
| UL |   |     |      | 1NAK |     | 3ACK | 4ACK |      |      | 1ACK | 2ACK | 3ACK |
| DL |   | 1DL |      | 3DL  | 4DL |      |      | 1RTX | 2RTX | 3DL  | 4DL  | 1DL  |

Grant lost

Fig. 4

|    | 0 | 1   | 2    | 3    | 4    | 5    | 6 | 7    | 8    | 9    | 10   | 11   |
|----|---|-----|------|------|------|------|---|------|------|------|------|------|
| UL |   | 1UL | No Tx| 2UL  |      |      |   | 1RTX | 2RTX | 3UL  |      |      |
| DL |   |     |      | 1NAK | 2NAK | 3NAK |   |      |      | 1ACK | 2ACK | 3ACK |

Fig. 5A

|    | 0 | 1   | 2   | 3    | 4    | 5    | 6 | 7    | 8    | 9    | 10   | 11   |
|----|---|-----|-----|------|------|------|---|------|------|------|------|------|
| UL |   | 1UL | 2UL | 3UL  |      |      |   | 1RTX | 2RTX | 3RTX |      |      |
| DL |   |     |     | 1NAK | 2ACK | 3NAK |   |      |      | 1ACK | 2ACK | 3ACK |

Fig. 5B

METHODS AND NODES IN A WIRELESS COMMUNICATION SYSTEM

CROSS-REFERENCE TO RELATED APPLICATIONS

This application is a continuation of International Application No. PCT/EP2014/077940, filed on Dec. 16, 2014, the disclosure of which is hereby incorporated by reference in its entirety.

TECHNICAL FIELD

Implementations described herein generally relate to a receiver, a method in a receiver, a transmitter and a method in a transmitter. Certain embodiments herein describe a mechanism for enabling HARQ feedback for data.

BACKGROUND ART

In conventional technologies, either synchronous or asynchronous Hybrid Automatic Repeat Request (HARQ) are used, with a certain number of HARQ processes. It is usually assumed that every transmission using HARQ is scheduled by a network node, such as an enhanced node B (eNodeB). However in fifth generation (5G) radio access, also contention based data transmissions may benefit from novel HARQ solutions tailored for low latencies with minimal control signalling.

In contention based data transmission, a User Equipment (UE) may access shared radio resources at any time without any scheduling. Therefore collisions will happen, but no signalling is required for scheduling. It would be desirable to send retransmissions in contention based manner without HARQ synchronisation problems.

In for example Third Generation Partnership Program (3GPP) Long Term Evolution (LTE), asynchronous Type-II HARQ transmission is used on the downlink. This means the receiver does not know ahead of time what is being transmitted, or when, so the HARQ process identifier and the Redundancy Version (RV) must be sent along with the data. The RV specifies which combination of data, Error-Detecting (ED), and Forward Error Correction (FEC) bits is being sent to the UE.

This is done through the Physical Downlink Shared Channel (PDSCH) resource allocation messages sent on a Physical Downlink Control Channel (PDCCH) simultaneous to the corresponding PDSCH transmission. The advantage of this scheme is that the scheduling algorithm has considerable freedom in deciding which UEs are sent data during any subframe.

In contrast, LTE uses synchronous HARQ transmission on the uplink (UL). This means that the eNodeB knows exactly which HARQ process and RV the UE will transmit ahead of time. So, this information does not have to be comprised in the PDCCH message providing the uplink scheduling information to the UE.

Synchronous HARQ can be used because the UE transmits the same HARQ process every eighth subframe. Because retransmissions of a HARQ process are associated with previous transmissions based on the eight-subframe delay, the scheduling in the uplink is not quite as flexible as that in the downlink.

Uplink retransmissions may be either adaptive or non-adaptive. When the UE receives a Negative Acknowledgement (NACK), then the UE shall send non-adaptive retransmission in subframe n+4 utilising the same resources which were allocated for the initial transmission. Adaptive retransmission is done when uplink grant is received and New Data Indication (NDI) bit is not toggled. In case of adaptive retransmission request, the UE does not care about HARQ feedback received for previous transmission attempt.

There are technical problems that may occur when any known conventional solution is applied in a 5G dense Radio Access Technology (RAT) system where latencies has to be <1 ms and control overhead must be minimised to make things efficient and also as simple as possible.

Asynchronous HARQ requires signalling between the involved nodes, since the HARQ process ID and RV information have to be carried for every transmission. Additionally non-adaptive asynchronous retransmissions are not possible.

Synchronous HARQ does not need HARQ process ID and RV information in order to work robustly, but it does not give as much scheduling freedom to network. This is a significant problem when a new scheduling dimension in Multi User (MU)—Multiple-Input and Multiple-Output (MIMO) and Coordinated Multipoint (CoMP) has to be taken into account. When UEs are scheduled also spatially in addition to time and frequency domains, UE orthogonality in spatial domain must be taken into account, which limits possible scheduling combinations for each Transmission Time Interval (TTI).

Conventional HARQ solutions do not take contention based data transmissions well into account, because an underlying assumption is that transmissions using HARQ are always scheduled in a way or another. It has been envisioned that one significant improvement in 5G compared to legacy systems is to support Machine-to-Machine (M2M) type of communication. Efficient way to do this is contention based data transmissions for small packets. With contention based transmissions there will not be UL grants, hence HARQ process IDs cannot be indicated for contention based UL data. If HARQ is still required, solution to handle also retransmissions on contention based manner is needed if the UE did not receive positive acknowledgement for the initial transmission attempt.

In 5G dense deployment supporting high UE density and mobility there will be many radio units operating close to each other and using coordinated beamforming techniques. Additionally more than one access nodes may send data jointly to any single UE. Hence, it would be beneficial that retransmission timing is not fixed to achieve more scheduling freedom and HARQ processes would not need to be synchronised between single access node and UE.

Hence, it is a general problem to assure that there is a reasonable trade-off between control channel overhead and performance when transmitting HARQ information.

SUMMARY

It is therefore an object to obviate at least some of the above mentioned disadvantages and to improve the performance in a wireless communication system.

This and other objects are achieved by the features of the appended independent claims. Further implementation forms are apparent from the dependent claims, the description and the figures.

According to a first aspect, a receiver is provided, for receiving data packets from a transmitter and provide a feedback on the successfulness of reception and decoding any data packet, to be received by the transmitter. The receiver comprises a receiving circuit, configured to receive a data packet from the transmitter. Further, the receiver comprises a first memory, configured to store successfully decoded data packets. Also, the receiver comprises a second memory, configured to store unsuccessfully decoded data packets. In addition, the receiver also comprises a processor configured to determine if the received data packet is a retransmission or a new transmission. The processor is also configured to combine the received data packet with the oldest unsuccessfully decoded data packet stored in the second memory when the received data packet is determined to be a retransmission. Furthermore, the processor is further configured to decode the received data packet when it is determined to be a new transmission, or decode the combined data packet and the oldest unsuccessfully decoded data packet stored in the second memory when it is determined to be a retransmission. The processor is further configured to check if the decoding of the data packet is successful, and store the decoded data packet in the first memory when the decoding of the data packet succeeded and in the second memory when the decoding failed. The receiver also comprises a transmitting circuit, configured to transmit feed-back information to the transmitter, concerning the successfulness in decoding the data packet.

Thanks to the presented concept of storing successfully received and decoded data packets in a first memory, and storing unsuccessfully decoded data packets in a second memory at the receiver side; and storing new data packets to be transmitted in a first memory and storing transmitted data packets for potential future retransmission in a second memory at the transmitter side, the transmission of process IDs in control indications could be omitted. Further asynchronous non-adaptive retransmissions are enabled. Thereby, control signalling is reduced, which improves spectral efficiency of the system. Also, by eliminating the requirements of HARQ ID synch between transmitter and receiver, implementation of multipoint transmission is enabled. Thereby, a robust HARQ solution is achieved, which has main advantages of both synchronous and asynchronous HARQ with minimal control signalling and also has support for contention based type of data transmissions.

In a first possible implementation of the receiver according to the first aspect, the transmitting circuit may be configured to combine the received data packet with the oldest unsuccessfully decoded data packet stored in the second memory by Maximum-Ratio Combining, MRC, when the received data packet is determined to be a retransmission.

By storing the unsuccessfully decoded data packet and combining it with the retransmitted data packet for decoding, it may be enabled to decode the combined transmission, even in case neither of the data packets can be decoded independently without error. Thereby repetitive retransmissions may be omitted.

In a second possible implementation of the receiver according to the first aspect, or the first possible implementation of the receiver according to the first aspect, the transmitting circuit may be configured to transmit feed-back information comprising a positive Acknowledgment (ACK), when the decoding of the received data packet is successful, and otherwise not transmitting any feed-back information, e.g. when the decoding of the received data packet is unsuccessful, or when an expected data packet is not received.

Thereby, by not transmitting any NACK from the receiver when an expected data packet is not received, and correspondingly let the transmitter retransmit said data packet when a corresponding ACK is not received, signalling overhead is reduced, which increases spectral efficiency of the system.

In a third possible implementation of the receiver according to the first aspect, or the first possible implementation of the receiver according to the first aspect, the transmitting circuit may be configured to transmit feed-back information comprising an ACK, when the decoding of the received data packet is successful, and otherwise transmitting a NACK, e.g. when the decoding of the received data packet is unsuccessful, or when an expected data packet is not received.

By transmitting NACK messages to the transmitter, when a retransmission is required, and by letting the transmitter only retransmit a transmitted message where a corresponding NACK has been received, it is avoided that retransmissions are made in the case where an ACK transmitted by the receiver is not received by the transmitter. Thus superfluous retransmissions may be omitted.

In a fourth possible implementation of the receiver according to the first aspect, or any previous possible implementation of the receiver according to the first aspect, the processor may be configured to decode the received data packet without any combination with the oldest unsuccessfully decoded data packet stored in the second memory, when the received data packet is determined to be a retransmission and the decoding of the combined data packet is unsuccessful.

The unsuccessful decoding of the received data packet, combined with the oldest stored unsuccessfully decoded data packet may result due to erroneous reception/decoding of the stored data packet, or from the made combination of the data packets, why decoding attempts of the retransmitted data packet may benefit from only decoding the retransmitted data packet. Thus decoding of the retransmitted data packet is simplified.

In a fifth possible implementation of the receiver according to the first aspect, or any previous possible implementation of the receiver according to the first aspect, the processor may be configured to compare the decoded data packet with the last stored successfully decoded data packet in the first memory when said data packet is determined to be a retransmission and is successfully decoded. The processor is further configured to discard the decoded data packet and transmit an ACK via the transmitting circuit, when the comparison confirms that the decoded data packet already has been received.

Thereby, by comparing the decoded data packet with stored successfully decoded data packets in the first memory, a redundant retransmission is detected by the receiver, and the data packet could be discarded.

In a sixth possible implementation of the receiver according to the first aspect, or any previous possible implementation of the receiver according to the first aspect, the processor may be configured to determine if the received data packet is a retransmission or a new transmission, based on a New Data Indication (NDI) received together with the data packet.

By providing an NDI associated with each data packet, a more robust and reliable detection of a retransmission/new transmission may be made.

According to a second aspect, a method in a receiver is provided, for receiving a set of data packets from a transmitter. The method comprises receiving a data packet. Further, the method comprises determining if the received data packet is a retransmission or a new transmission. The method also comprises combining the received data packet with the oldest unsuccessfully decoded data packet stored in a second memory, when the received data packet is determined to be a retransmission. Further the method comprises decoding the received data packet when it is determined to be a new transmission, and/or decoding the combined data packet and oldest unsuccessfully decoded data packet stored in the second memory when it is determined to be a retransmission. The method in addition comprises checking if the decoding of the data packet is successful by computing check sum and comparing with an expected value. The method also comprises deleting the oldest stored data packet in the first memory. The method further comprises storing the decoded data packet in the first memory when the checking of the decoding is successful or storing the decoded data packet in the second memory when the checking of the decoding is not successful. The method further comprises transmitting feed-back information to the transmitter, concerning the successfulness in decoding the received data packet.

Thanks to the presented concept of storing successfully received and decoded data packets in a first memory, and storing unsuccessfully decoded data packets in a second memory at the receiver side; and storing new data packets to be transmitted in a first memory and storing transmitted data packets for potential future retransmission in a second memory at the transmitter side, the transmission of process IDs in control indications could be omitted. Further asynchronous non-adaptive retransmissions are enabled. Thereby, control signalling is reduced, which improves spectral efficiency of the system. Also, by eliminating the requirements of HARQ ID synch between transmitter and receiver, implementation of multipoint transmission is enabled. Thereby, a robust HARQ solution is achieved, which has main advantages of both synchronous and asynchronous HARQ with minimal control signalling and also has support for contention based type of data transmissions.

In a first possible implementation of the method according to the second aspect, the received data packet may be combined with the oldest unsuccessfully decoded data packet stored in the second memory by Maximum-Ratio Combining, MRC, when the received data packet is determined to be a retransmission.

By storing the unsuccessfully decoded data packet and combining it with the retransmitted data packet for decoding, it may be enabled to decode the combined transmission, even in case neither of the data packets can be decoded independently without error. Thereby repetitive retransmissions may be omitted.

In a second possible implementation of the method according to the second aspect, or the first possible implementation of the method according to the second aspect, the transmitted feed-back information may comprise an ACK, when the decoding of the received data packet is successful, and otherwise inhibiting the transmission of feed-back information, e.g. when the decoding of the received data packet is unsuccessful, or when an expected data packet is not received.

Thereby, by not transmitting any NACK from the receiver when an expected data packet is not received, and correspondingly let the transmitter retransmit said data packet when a corresponding ACK is not received, signalling overhead is reduced, which increases spectral efficiency of the system.

In a third possible implementation of the method according to the second aspect, or the first possible implementation of the method according to the second aspect, the transmitted feed-back information comprises an ACK, when the decoding of the received data packet is successful, and otherwise transmitting a NACK, e.g. when the decoding of the received data packet is unsuccessful, or when an expected data packet is not received.

By transmitting NACK messages to the transmitter, when a retransmission is required, and by letting the transmitter only retransmit a transmitted message where a corresponding NACK has been received, it is avoided that retransmissions are made in the case where an ACK transmitted by the receiver is not received by the transmitter. Thus superfluous retransmissions may be omitted.

In a fourth possible implementation of the method according to the second aspect, or any previous possible implementation of the method according to the second aspect, the received data packet may be decoded without any combination with the oldest unsuccessfully decoded data packet stored in the second memory, when the received data packet is determined to be a retransmission and the decoding of the received data packet is unsuccessful.

The unsuccessful decoding of the received data packet, combined with the oldest stored unsuccessfully decoded data packet may result due to erroneous reception/decoding of the stored data packet, or from the made combination of the data packets, why decoding attempts of the retransmitted data packet may benefit from only decoding the retransmitted data packet. Thus decoding of the retransmitted data packet is simplified.

In a fifth possible implementation of the method according to the second aspect, or any previous possible implementation of the method according to the second aspect, the received data packet may be compared with the last stored successfully decoded data packet in the first memory when the comparison confirms that the received data packet already has been received, discarding the decoded data and transmitting an ACK, in case the received data packet is determined to be a retransmission and is successfully decoded.

Thereby, by comparing the decoded data packet with storied successfully decoded data packets in the first memory, a redundant retransmission is detected by the receiver, and the data packet could be discarded.

In a sixth possible implementation of the method according to the second aspect, or any previous possible implementation of the method according to the second aspect, it may be determined if the received data packet is a retransmission or a new transmission, based on an NDI received together with the data packet.

By providing an NDI associated with each data packet, a more robust and reliable detection of a retransmission/new transmission may be made.

According to a third aspect, a computer program is provided, comprising program code for performing a method according to the second aspect, or any possible implementation of the method according to the second aspect, when the computer program runs on a receiver according to the first aspect, or any possible implementation of the receiver according to the first aspect.

Thanks to the presented concept of storing successfully received and decoded data packets in a first memory, and storing unsuccessfully decoded data packets in a second memory at the receiver side; and storing new data packets to be transmitted in a first memory and storing transmitted data packets for potential future retransmission in a second memory at the transmitter side, the transmission of process IDs in control indications could be omitted. Further asynchronous non-adaptive retransmissions are enabled. Thereby, control signalling is reduced, which improves spectral efficiency of the system. Also, by eliminating the requirements of HARQ ID synch between transmitter and receiver, implementation of multipoint transmission is enabled. Thereby, a robust HARQ solution is achieved, which has main advantages of both synchronous and asynchronous HARQ with minimal control signalling and also has support for contention based type of data transmissions.

According to a fourth aspect, a transmitter is provided, for transmitting a set of data packets to a receiver. The transmitter comprises a transmitting circuit configured to transmit a data packet, to be received by the receiver. The transmitting circuit configured to retransmit any data packet determined to be retransmitted. Further, the transmitter also comprises a first memory, configured to store new data packets arriving to the transmitter. Additionally, the transmitter also comprises a second memory, configured to store transmitted data packets for potential future retransmission. The transmitter also comprises a processor configured to determine to retransmit the transmitted data packet when an ACK, associated with the transmitted data packet has not been received from the receiver within a predetermined time period. Furthermore, the processor is further configured to place the data packet determined to be retransmitted at the end of the second memory.

Thanks to the presented concept of storing successfully received and decoded data packets in a first memory, and storing unsuccessfully decoded data packets in a second memory at the receiver side; and storing new data packets to be transmitted in a first memory and storing transmitted data packets for potential future retransmission in a second memory at the transmitter side, the transmission of process IDs in control indications could be omitted. Further asynchronous non-adaptive retransmissions are enabled. Thereby, control signalling is reduced, which improves spectral efficiency of the system. Also, by eliminating the requirements of HARQ ID synch between transmitter and receiver, implementation of multipoint transmission is enabled. Thereby, a robust HARQ solution is achieved, which has main advantages of both synchronous and asynchronous HARQ with minimal control signalling and also has support for contention based type of data transmissions.

In a first possible implementation of the transmitter according to the fourth aspect, the processor may be further configured to check if the second memory is empty, and, when the second memory is not empty: to detect a data packet in the second memory for which a NACK has been received from the receiver. Further, the processor may be further configured to extract the detected data packet in the second memory, whose initial transmission attempt is oldest. The transmitting circuit may be further configured to retransmit the extracted data packet when the second memory is not empty. Otherwise, when the second memory is empty, the transmitting circuit may be configured to transmit a new data packet in the set of data packets from a first memory, to be received by the receiver.

By further specifying how the first and second memories of the transmitter are utilised and storing transmitted data packets in a potential retransmission buffer, retransmissions may be made synchronised.

According to a fifth aspect, a method in a transmitter is provided, for transmitting a set of data packets to a receiver. The method comprises transmitting a data packet from a first memory, to be received by the receiver. Further the method comprises placing the transmitted data packet at the end of a second memory. Also, the method comprises determining to retransmit the transmitted data packet when an ACK, associated with the transmitted data packet has not been received from the receiver within a predetermined time period. Further the method also comprises placing the data packet determined to be retransmitted at the end of a second memory. In addition the method comprises retransmitting the data packet determined, to be retransmitted.

Thanks to the presented concept of storing successfully received and decoded data packets in a first memory, and storing unsuccessfully decoded data packets in a second memory at the receiver side; and storing new data packets to be transmitted in a first memory and storing transmitted data packets for potential future retransmission in a second memory at the transmitter side, the transmission of process IDs in control indications could be omitted. Further asynchronous non-adaptive retransmissions are enabled. Thereby, control signalling is reduced, which improves spectral efficiency of the system. Also, by eliminating the requirements of HARQ ID synch between transmitter and receiver, implementation of multipoint transmission is enabled. Thereby, a robust HARQ solution is achieved, which has main advantages of both synchronous and asynchronous HARQ with minimal control signalling and also has support for contention based type of data transmissions.

In a first possible implementation of the method according to the fifth aspect, checking if the second memory is empty. Also, the method comprises, when the second memory is not empty: detecting a data packet in the second memory for which feed-back information has been received from the receiver. The method also comprises, when a data packet with negative feed-back has been detected: extracting the detected data packet in the second memory, whose initial transmission attempt is oldest; and also placing the extracted data packet at the end of the second memory; and retransmitting the extracted data packet. In case a data packet with positive feed-back, ACK, has been detected: the method further comprises removing the detected data packet from the second memory; transmitting a new data packet in the set of data packets from first memory, to be received by the receiver; and also placing the transmitted data packet at the end of the second memory. Otherwise, when no packet with feed-back has been detected: the method further comprises transmitting a new data packet in the set of data packets from the first memory, to be received by the receiver. Otherwise, when the second memory is empty: the method also additionally comprises transmitting a new data packet in the set of data packets from first memory, to be received by the receiver.

According to a sixth aspect, a computer program is provided, comprising program code for performing a method according to the fifth aspect, or any possible implementation of the method according to the fifth aspect, when the computer program runs on a transmitter according to the fourth aspect, or any possible implementation of the transmitter according to the fourth aspect.

Thanks to the presented concept of storing successfully received and decoded data packets in a first memory, and storing unsuccessfully decoded data packets in a second memory at the receiver side; and storing new data packets to be transmitted in a first memory and storing transmitted data packets for potential future retransmission in a second memory at the transmitter side, the transmission of process IDs in control indications could be omitted. Further asynchronous non-adaptive retransmissions are enabled. Thereby, control signalling is reduced, which improves spectral efficiency of the system. Also, by eliminating the requirements of HARQ ID synch between transmitter and receiver, implementation of multipoint transmission is enabled. Thereby, a robust HARQ solution is achieved, which has main advantages of both synchronous and asynchronous HARQ with minimal control signalling and also has support for contention based type of data transmissions. Thus an improved performance within a wireless communication system is provided.

Other objects, advantages and novel features of the aspects of the invention will become apparent from the following detailed description.

BRIEF DESCRIPTION OF DRAWINGS

Various embodiments are described in more detail with reference to attached drawings in which:

FIG. 2A is a block diagram illustrating basic transmission and retransmission according to an embodiment.

FIG. 2B is a block diagram illustrating basic transmission and retransmission according to an embodiment.

FIG. 3A is a block diagram illustrating multiple retransmissions according to an embodiment.

FIG. 3B is a block diagram illustrating multiple retransmissions according to an embodiment.

FIG. 3C is a block diagram illustrating multiple retransmissions according to an embodiment.

FIG. 4 is a block diagram illustrating lost scheduling grant and data transmission according to an embodiment.

FIG. 5A is a block diagram illustrating uplink data transmission with HARQ according to an embodiment.

FIG. 5B is a block diagram illustrating uplink data transmission with HARQ according to an embodiment.

DESCRIPTION OF EMBODIMENTS

Embodiments of the invention described herein are defined as a receiver, a method in a receiver, a transmitter and a method in a transmitter which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
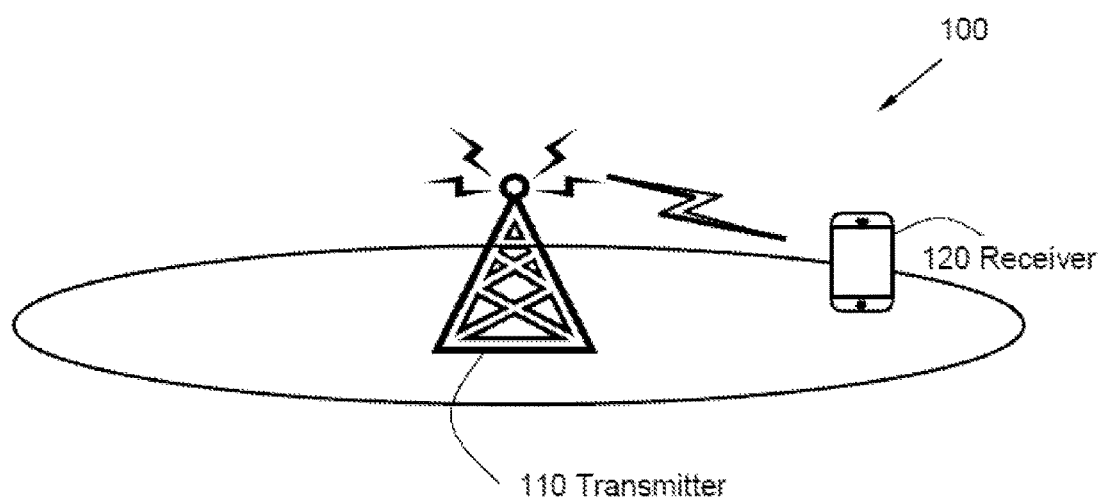
FIG. 1A is a block diagram illustrating a wireless communication system according to some embodiments.

FIG. 1A is a schematic illustration over a wireless communication system 100 comprising a transmitter 110 communicating with a receiver 120.

The wireless communication system 100 may at least partly be based on e.g. 3GPP LTE, LTE-Advanced, LTE fourth generation mobile broadband standard, Evolved Universal Terrestrial Radio Access Network (E-UTRAN), Worldwide Interoperability for Microwave Access (Wi-Max), WiFi, just to mention some few options. Although 5G latency and frame structure visions have been used in examples and illustrations, described HARQ solution is also applicable with LTE-A frame structure and resource grid. Additionally number of parallel HARQ processes may be dependent from desired delay and may thus be adjusted.

The expressions "wireless communication network", "wireless communication system" and/or "cellular telecommunication system" may within the technological context of this disclosure sometimes be utilised interchangeably.

The wireless communication system 100 may be configured to operate according to the Time-Division Duplex (TDD), or Frequency Division Duplexing (FDD) principles for multiplexing, according to different embodiments.

In the illustrated wireless communication system 100 the transmitter 110 comprises a radio network node and the receiver 120 comprises a UE, wherein the radio network node may be serving one or more cells.

The UE, also known as a mobile station, wireless terminal and/or mobile terminal is enabled to communicate wirelessly in a wireless communication system 100, sometimes also referred to as a cellular radio system or a wireless communication network. The communication may be made, e.g., between UEs, between a UE and a wire connected telephone and/or between a UE and a server via a Radio Access Network (RAN) and possibly one or more core networks. The wireless communication may com-prise various communication services such as voice, messaging, packet data, video, broad-cast, etc.

The UE/recipient may further be referred to as mobile telephone, cellular telephone, computer tablet or laptop with wireless capability, etc. The UE in the present context may be, for example, portable, pocket-storable, hand-held, computer-comprised, or vehicle-mounted mobile devices, enabled to communicate voice and/or data, via the radio access network, with another entity, such as another UE or a server.

The purpose of the illustration in FIG. 1A is to provide a simplified, general overview of the methods and nodes, such as the transmitter 110 and receiver 120 herein described, and the functionalities involved. The methods, transmitter 110 and receiver 120 will subsequently, as a non-limiting example, be described in a LTE environment, but the embodiments of the disclosed methods, transmitter 110 and receiver 120 may operate in a wireless communication system 100 based on another access technology such as e.g. any of the above enumerated. Thus, although the embodiments of the method are described based on, and using the lingo of, LTE systems, it is by no means limited to LTE.

The transmitter 110 may according to some embodiments be referred to as e.g. a radio network node, a base station, a NodeB, an evolved Node Bs (eNB, or eNode B), a base transceiver station, an Access Point Base Station, a base station router, a Radio Base Stations (RBS), a macro base station, a micro base station, a pico base station, a femto base station, a Home eNodeB, a sensor, a beacon device, a relay node, a repeater or any other network node configured for communication with the receiver 120 over a wireless interface, depending e.g. of the radio access technology and terminology used.

Sometimes, the expression "cell" may be used for denoting the radio network node itself. However, the cell may also in normal terminology be used for the geographical area where radio coverage is provided by the radio network node at a base station site. One radio net-work node, situated on the base station site, may serve one or several cells. The radio net-work nodes may communicate over the air interface operating on radio frequencies with any UE within range of the respective radio network node.

The receiver 120 may correspondingly, in some embodiments, be represented by e.g. a UE, a wireless communication terminal, a mobile cellular phone, a Personal Digital Assistant (PDA), a wireless platform, a mobile station, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the transmitter 110, according to different embodiments and different vocabulary used.

Figure 1B:
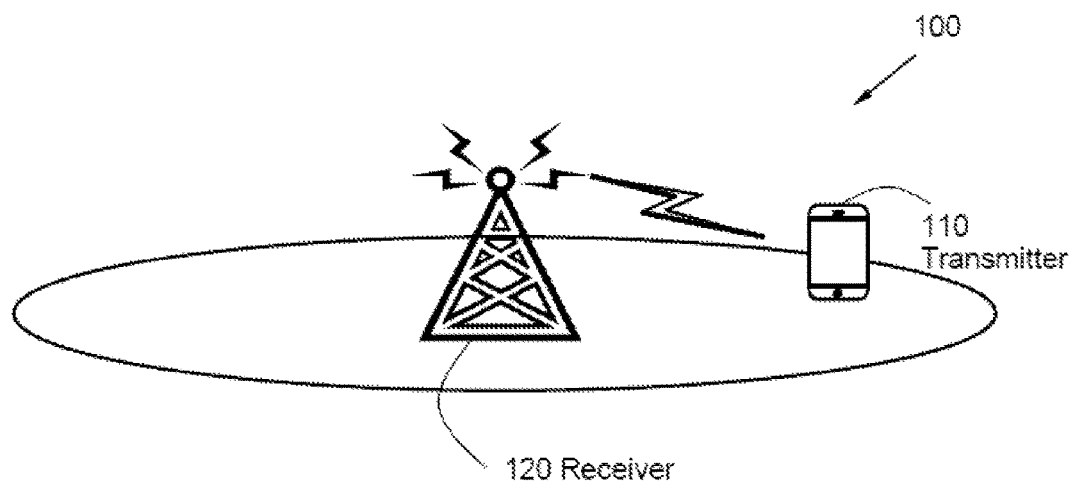
FIG. 1B is a block diagram illustrating a wireless communication system according to some embodiments.

However, in other alternative embodiments, as illustrated in FIG. 1B, the situation may be reversed. Thus the receiver 120 in some embodiments may be represented by e.g. a radio network node, a base station, a NodeB, an eNB, or eNode B, a base transceiver station, an Access Point Base Station, a base station router, a RBS, a macro base station, a micro base station, a pico base station, a femto base station, a Home eNodeB, a sensor, a beacon device, a relay node, a repeater or any other network node configured for communication with the transmitter 110 over a wireless interface, depending e.g. of the radio access technology and terminology used.

Thereby, also in some such alternative embodiments the transmitter 110 may be represented by e.g. a UE, a wireless communication terminal, a mobile cellular phone, a PDA, a wireless platform, a mobile station, a portable communication device, a laptop, a computer, a wireless terminal acting as a relay, a relay node, a mobile relay, a CPE, a FWA nodes or any other kind of device configured to communicate wirelessly with the receiver 120, according to different embodiments and different vocabulary used.

The transmitter 110 is configured to transmit radio signals comprising information to be received by the receiver 120. Correspondingly, the receiver 120 is configured to receive radio signals comprising information transmitted by the transmitter 110.

The illustrated network setting of one receiver 120 and one transmitter 110 in FIG. 1A and FIG. 1B respectively, are to be regarded as non-limiting examples of different embodiments only. The wireless communication system 100 may comprise any other number and/or combination of transmitters 110 and/or receiver/s 120, although only one instance of a receiver 120 and a transmitter 110, respectively, are illustrated in FIG. 1A and FIG. 1B, for clarity reasons. A plurality of receivers 120 and transmitters 110 may further be involved in some embodiments.

Thus whenever "one" or "a/an" receiver 120 and/or transmitter 110 is referred to in the present context, a plurality of receivers 120 and/or transmitter 110 may be involved, according to some embodiments.

A robust HARQ solution is provided which has main advantages of both synchronous and asynchronous HARQ with minimal control signalling and has support for contention based type of data transmissions. Target for the design is that HARQ Round Trip Time (RTT) has to meet 5G requirements, i.e. it has to be less than 1 ms. This indicates that most probably not so many simultaneous HARQ processes are required or cannot even be supported due to tight latency requirements. Additionally reduced amount of HARQ processes will reduce amount of required memory on modem hardware, which makes chips cheaper.

Additionally aim is to get rid of HARQ ID synch between access node and UE, required in legacy systems. This would help to specify and implement HARQ to dense outdoor radio access network utilising multi-point transmission possibility, where there might be several access nodes transmitting data to a single UE in coordinated manner.

To support 5G latency requirements, subframe has to be <0.250 ms long. However, in conventional solutions, it has been proposed having 4 processes in synchronous HARQ. Even though choosing synchronous HARQ simplifies things compared to asynchronous HARQ, but scheduling loses its freedom, which might be a big limiting factor when utilising MU-MIMO or CoMP.

To tackle said problems presented in the background section, HARQ may utilise a retransmission queue system. When transmission fails, then the transmitter 110 puts failed transmission at the end of the retransmission queue. After scheduling decisions, the transmitter 110 can check whether it has failed transmissions at the end of the retransmission queue and do retransmission of the packet, whose initial transmission attempt is oldest. When acknowledgements are waited, the transmitter 110 may send new data, with a new data indication, or re-transmissions to other HARQ processes. HARQ process numbers are not needed to indicate because both ends are expecting that retransmissions are concerning only the oldest packet with negative acknowledgement or no acknowledgement at all are received.

As said, HARQ IDs are not transmitted. Therefore if ACK is not received by the transmitter 110, then the transmitter 110 makes a retransmission of the associated data packet. This retransmission is then obsolete since the packet has already been correctly received, but the receiver 120 can notice that by comparing the packet with the last packets it has received for other HARQ processes. HARQ process numbering does not have to be in synch between the receiver 120 and the transmitter 110. The receiver 120 is just mandated to store N most recent (new or re-transmissions), where N is a number of parallel HARQ processes.

Additionally this kind of mechanism would work for contention based transmissions. Basically proposed algorithm does not necessarily require NACKs at all. So when the transmitter 110 sends contention based data packet, then the receiver 120 can send acknowledgement for successful transmissions. If the transmission was not considered to be successful, then the transmitter 110 can decide whether to send a retransmission or just lose the packet and send the next new data packet.

The subsequently presented and discussed examples will explain more carefully different realisations and embodiments of the methods and nodes.

These examples use 4 HARQ processes. However any other arbitrary number of HARQ processes may be utilised in different embodiments, but because of the aim of solving 5G dense Radio Access Technology (RAT) HARQ issues keeping <1 ms latency requirements in mind, to utilise 4 parallel processes were chosen for the illustrations. It is also assumed in the examples that 1 subframe processing time is given for transmissions. Invention can be utilised in both directions Uplink (UL) and Downlink (DL). The non-limiting examples are drawn for DL data transmission use cases.

In the present context, the expressions downlink (DL), downstream link or forward link may be used for the transmission path from the network node to the UE. The expression uplink (UL), upstream link or reverse link may be used for the transmission path in the opposite direction, i.e., from the UE to the network node.

According to some embodiments, it will be possible to manage asynchronous retransmissions without HARQ related DL control signalling. Further, according to some embodiments, HARQ is enabled, for contention based data transmission mode. Also, according to some embodiments, it will be disclosed how to recover from lost acknowledgements without HARQ IDs and HARQ synchronisation. Further, it will in some embodiments be disclosed how to recover from mismatch caused by lost scheduling grants. According to some embodiments, utilisation of a HARQ retransmission queue is made, for keeping retransmissions synchronised.

FIG. 2A shows basic use cases where data is sent successfully for 4 HARQ processes. Used frequency carrier can be either unpaired TDD carrier or paired FDD carrier in different embodiments. In the first example, for every sent DL transmission, ACK is sent by the receiver 120 in subframe N+2, if initial transmission were made in subframe N. E.g. for DL transmission in subframe 1, acknowledgement is received in subframe 3.

FIG. 2B illustrates an example, wherein the first new DL data is sent and second DL transmission in subframe 2 fails. The receiver 120 sends NACK in subframe 4. Then retransmission can take place whenever next resources are scheduled for the corresponding receiver 120. The network can still schedule new data until certain specified subframe from failed transmission. In this example it is assumed that 1 subframe processing time is given after every transmission. Hence, in this example the network could send new DL transmissions until N+3 if there were a failed transmission in subframe N. After that, the next DL transmission may be retransmission of the oldest failed packet.

FIGS. 3A-3C shows how more complex retransmission cases can be handled and how algorithm can recover quickly from lost acknowledgements.

FIGS. 3A illustrates a first example, wherein retransmissions can be sent without strict specified subframes.

FIGS. 3B presents a second example, illustrating that new data can be sent until it is notified that failure has happened. However this may be specified that how many subframes after negative acknowledgement new transmissions can be sent. Because scheduling decisions have to be done a bit in advance, it may here be assumed that after NACK, still one subframe can be sent after retransmission is mandated.

FIGS. 3C disclose yet an example, wherein it is illustrated how HARQ can recover from missed acknowledgement. The receiver 120 can compare a received packet with the last successfully received packets and notice that the packet has been already received.

In FIG. 4, the difference between NACK and no HARQ feedback is illustrated. With NACK, the receiver 120 can indicate that it has tried to decode packet, but it was an unsuccessful attempt. Therefore retransmission may also be adaptive. When no HARQ feedback is received, then the transmitter 110 can assume that data has been completely lost and that the transmitter 110 shall retransmit packet as an adaptive retransmission.

In case of contention based data transmissions with HARQ enabled, only ACKs may be sent. Transmissions are not scheduled anyway so the transmitter 110 may send retransmission after monitoring acknowledgement window and not succeeding to receive ACK. Retransmission time and frequency resources can depend on e.g. contention based channel limitations and back-off timer etc.

FIGS. 5A and 5B shows how UL transmissions can recover from lost scheduling grants or positive acknowledgements.

In FIG. 5A, a scenario is illustrated wherein the grant is lost and the uplink transmission is not received. The receiver 120 may then optionally send NACK in some embodiments. When the UE gets retransmission allocation, the oldest failed data packet in the retransmission queue may be transmitted. When the UE gets another retransmission allocation, the second oldest data packet in the retransmission queue may be transmitted. Then, the third allocation is received. As there is no more data to retransmit in the retransmission queue, new data may be transmitted. Thereafter, the transmission may continue as planned, i.e. before the scheduling was lost.

In FIG. 5B, another scenario is illustrated wherein three data packets are transmitted in the uplink and three NACKs are received by the UE. The UE then retransmit the three data packets and also receives three ACKs from the network node.

Figure 6A:
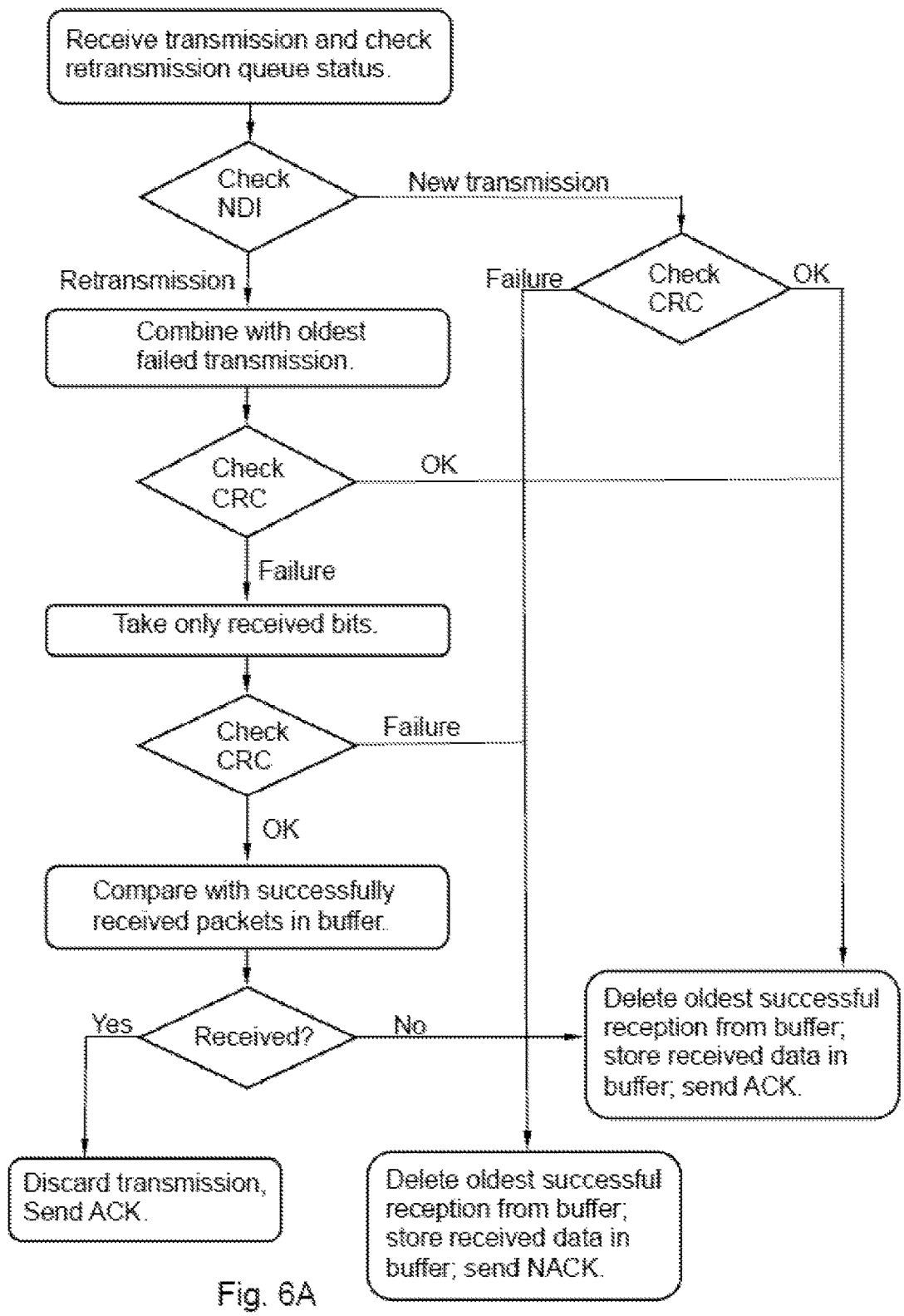
FIG. 6A is a flow chart illustrating a state machine for receiving data according to an embodiment.

FIG. 6A show a simplified state machine explaining how embodiments of the disclosed solution may be utilised in practice by the receiver 120 when receiving data transmission from the transmitter 110.

When receiving data transmission, as illustrated in FIG. 6A, the receiver 120 firstly may check New Data Indication (NDI) bit, if available. If NDI indicates retransmission, then retransmission may be combined with oldest failed transmission stored into a memory after last transmission attempt. If transmission was new, then Cyclic Redundancy Check (CRC) result may be checked immediately. The CRC check result indicates whether data decoding attempt was successful or not. If decoding was successful positive acknowledgement can be sent and data is stored into a buffer or memory. If sent ACK gets lost, then useless retransmission can be noticed by comparing retransmission with the latest stored successful transmissions. Hence, if it is noticed that the retransmitted packet has been already received, then transmission can be discarded and an ACK can be sent to the transmitter 110. If decoding was unsuccessful and packet has not been yet received, then decoded bits may be stored in the retransmission buffer, or memory. When the same packet is later retransmitted, then probability of successful decoding will increase due to combining possibilities with the stored unsuccessful packet.

Figure 6B:
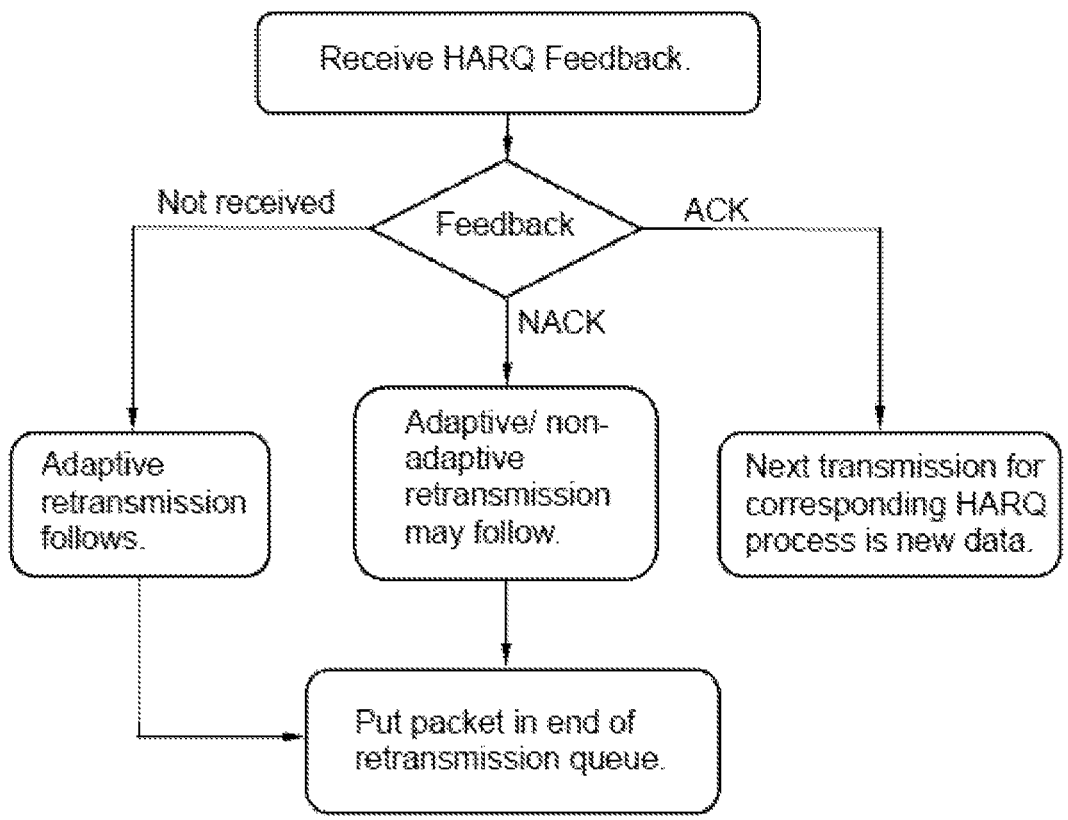
FIG. 6B is a flow chart for formulating a retransmission queue according to an embodiment.

FIG. 6B illustrates simplified state machine describes actions when the transmitter 110 is receiving HARQ feedback. If feedback is not received during an expected time window, then NACK is assumed and retransmission may follow. If NACK is received then retransmission may follow. In case of NACK, it is also possible to specify that retransmission is sent non-adaptively on certain time/frequency resources without new scheduling grant. However if data is sent in contention based transmission mode, then retransmissions can be always sent whenever the transmitter 110 chooses on certain time/frequency resources dedicated for contention based data transmissions/retransmissions.

Figure 6C:
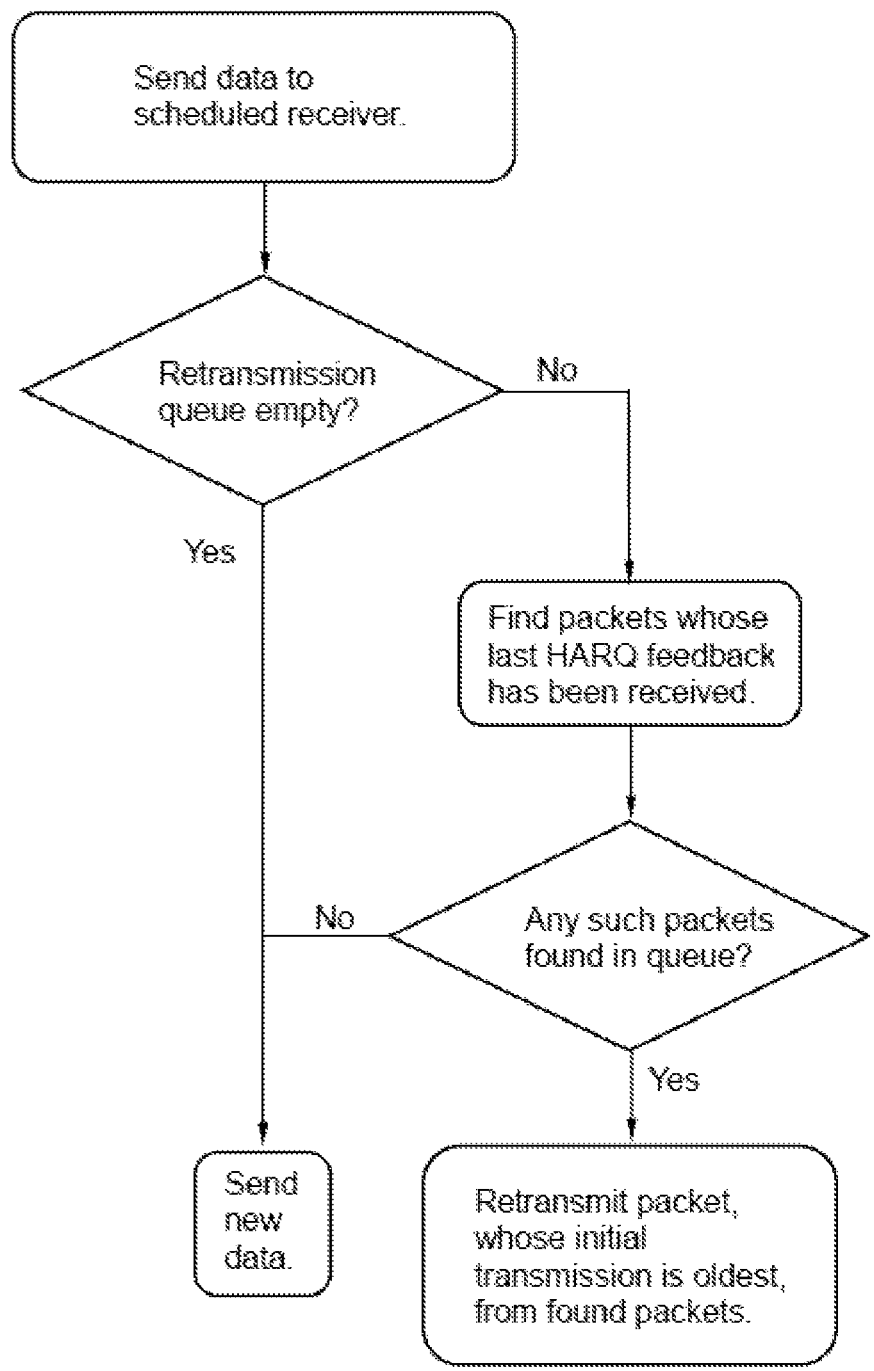
FIG. 6C is a flow chart illustrating a state machine for sending data to certain scheduled receiver according to an embodiment.

FIG. 6C illustrates a scenario where the transmitter 110 sends data after scheduling decisions have been made. The transmitter 110 may send data after scheduling decisions done in every subframe for each scheduled UE. Idea is always to prioritise retransmissions to keep HARQ round-trip-time short and keep HARQ synchronised without HARQ ID information. Hence first it may be checked whether retransmission queue is empty or not. If there are packets that may be retransmitted, then retransmission may take place. It may be taken into account that if HARQ feedback information is not received and decoded for all packets in the retransmission queue, then new data can be sent until reception of HARQ feedback for those pending retransmissions. This feature is also illustrated in FIGS. 2A, 2B and 3A, 3B, 3C.

If the above described algorithm is compared to HARQ methods used in conventional LTE solutions. It is new that HARQ is kept synchronised without HARQ ID signalling with prioritising retransmission and sending always retransmissions before new data. New data can be sent only when retransmission queue is empty or transmitter is waiting for HARQ feedback for all retransmissions in retransmission queue. Additionally also selecting previous transmission for combining with retransmission without HARQ ID signalling may be based on prioritising retransmissions.

As said, the herein described embodiments may be utilised also for contention based data transmissions. As stated in Mobile and wireless communications Enablers for the Twenty-twenty Information Society (METIS) 5G concepts, Massive Machine Communication aspects may be taken into account in 5G design comprising possibility for contention-based transmissions. One way to have HARQ supported also for this type of traffic may be sending only ACKs for successfully received transmissions. Then if transmissions fails and ACK is not received, the transmitter 110 may retransmit oldest failed packet at the next occasion for its contention based data or e.g. after some transmitter selected back-off time. To help access node's error recovery and queue handling procedure with contention based retransmissions, one bit may indicate whether contention based UL transmission is new data or a retransmission.

Thanks to at least some embodiments, reduced control signalling is achieved, i.e. no need to inform about e.g. process IDs in control indication and also asynchronous non-adaptive retransmissions will be possible.

Furthermore, a minimal latency for retransmissions is achieved. Thereby the latency requirement (<1 ms) of 5G is fulfilled. Also, the disclosed solution provides a similar scheduling flexibility than with asynchronous HARQ.

Thus the presented methods may be utilised also for contention based transmissions where HARQ process tracking becomes challenging and UEs are not scheduled i.e. traditional adaptive and non-adaptive retransmissions are challenging to carry the HARQ process IDs does not need to be in synch between the UE and the single access node.

Figure 7:
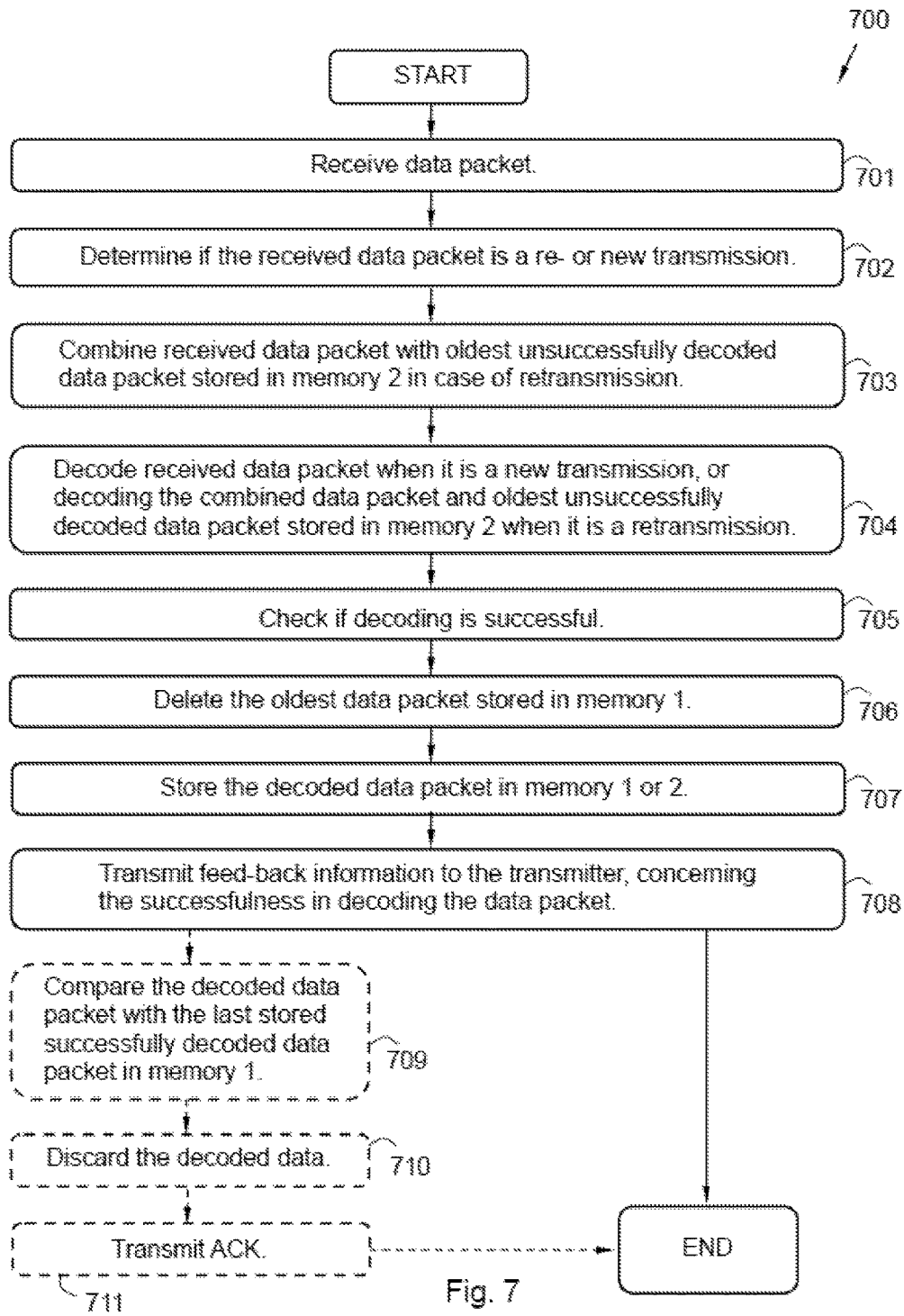
FIG. 7 is a flow chart illustrating a method in a receiver according to an embodiment.

FIG. 7 is a flow chart illustrating embodiments of a method 700 in a receiver 120 for receiving a set of data packets from a transmitter 110, and transmitting feed-back information to the transmitter 110, concerning the successfulness in decoding the received set of data packets.

The receiver 120 may comprise a UE while the transmitter 110 may comprise a network node such as an eNodeB in some embodiments. In other embodiments, the situation may be the opposite, i.e. the receiver 120 may comprise a network node such as an eNodeB while the transmitter 110 comprise a UE. The transmitter 110 and the receiver 120 may be comprised in a wireless communication network 100. Such wireless communication network 100 may be based on LTE. Further, the wireless communication system 100 may be based on FDD or TDD in different embodiments.

To appropriately receive the set of data packets from the transmitter 110, the method 700 may comprise a number of actions 701-711.

It is however to be noted that any, some or all of the described actions 701-711, may be performed in a somewhat different chronological order than the enumeration indicates, be performed simultaneously or even be performed in a completely reversed order according to different embodiments. Some actions may be performed within some alternative embodiments such as e.g. action 709, 710 and/or 711. Further, it is to be noted that some actions may be performed in a plurality of alternative manners according to different embodiments, and that some such alternative manners may be performed only within some, but not necessarily all embodiments. The method 700 may comprise the following actions:

Action 701 comprises receiving a data packet, comprised in a set of data packets.

The data packet may be received from the transmitter 110.

Action 702 comprises determining if the received 701 data packet is a retransmission or a new transmission.

In some embodiments, it may be determined that the received 701 data packet is a retransmission or a new transmission, based on an NDI received 701 together with the data packet.

Action 703 comprises combining the received 701 data packet with oldest unsuccessfully decoded data packet, or failed transmission as it also may be referred to as, stored in a second memory, when the received 701 data packet is determined 702 to be a retransmission. Thus action 703 may only be performed when the data packet is determined 702 to be a retransmission.

In some embodiments, the received 701 data packet and the stored oldest unsuccessfully decoded data packet stored in the second memory (850) may be combined by Maximum-Ratio Combining (MRC) when the received data packet is determined to be a retransmission.

MRC may sometimes also be referred to as ratio-squared combining and/or pre-detection combining, and may comprise adding the respective signals, in proportion to their respective Signal-to-noise ratio.

Action 704 comprises decoding the received 701 data packet when it is determined 702 to be a new transmission. When the received 701 data packet is determined 702 to be a retransmission, the combined 703 data packet and oldest unsuccessfully decoded data packet stored in the second memory is decoded.

According to some embodiments, the decoding may be made, in case the received 701 data packet is determined 702 to be a retransmission and the decoding 704 of the received 701 data packet is unsuccessful, by only decoding the received 701 data packet without making any combination 703 with the oldest unsuccessfully decoded data packet stored in the second memory.

Action 705 comprises checking if the decoding 704 of the data packet is successful e.g. by computing a check sum and comparing the computed checksum with an expected value. For example Cyclic Redundancy Check (CRC) or any other convenient error-detecting code may be used in some embodiments.

Action 706 comprises deleting the oldest stored data packet in the first memory 840;

Action 707 comprises storing the decoded 704 data packet in the first memory 840 when the checking 705 of the decoding 704 is successful; or storing 707 the decoded 704 data packet in the second memory 850 when the checking 705 of the decoding 704 is not successful.

Action 708 comprises transmitting feed-back information to the transmitter 110, concerning the successfulness in decoding 704 the received 701 data packet.

The transmitted feed-back information may comprise an ACK when the decoding 704 of the received 701 data packet is successful, and otherwise inhibiting the transmission 708 of any feed-back information, in some embodiments.

The transmitted feed-back information may in some embodiments comprise an ACK when the decoding 704 of the received 701 data packet is successful, and otherwise transmitting a NACK.

Action 709 may be performed only in some optional embodiments, when the received 701 data packet is determined 702 to be a retransmission and is successfully decoded 704.

The received 701 data packet is compared with the last stored 707 successfully received 701 data packet in the first memory.

Action 710 may be performed only in some optional embodiments, when the received 701 data packet is determined 702 to be a retransmission and is successfully decoded 704 and the comparison 709 confirms that the received 701 data packet already has been received.

The decoded 701 data packet is discarded.

Action 711 may be performed only in some optional embodiments, when the received 701 data packet is determined 702 to be a retransmission and is successfully decoded 704 and the comparison 709 confirms that the received 701 data packet already has been received.

An ACK is transmitted, to be received by the transmitter 110.

Figure 8:
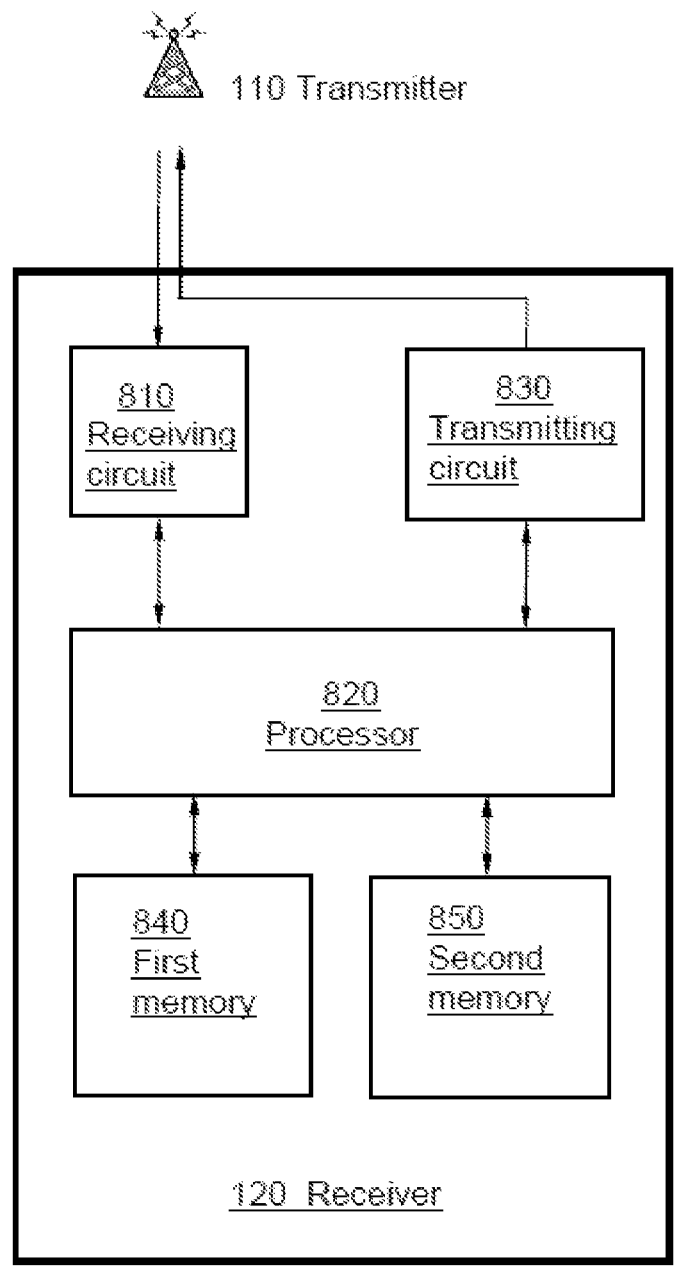
FIG. 8 is a block diagram illustrating a receiver according to an embodiment.

FIG. 8 illustrates an embodiment of a receiver 120. The receiver 120 is configured for receiving a set of data packets from a transmitter 110, by performing the method 700 according to at least some of the actions 701-711.

The receiver 120 may comprise a UE while the transmitter 110 may comprise a network node such as an eNodeB in some embodiments. In other embodiments, the situation may be the opposite, i.e. the receiver 120 may comprise a network node such as an eNodeB while the transmitter 110 comprise a UE. The transmitter 110 and the receiver 120 may be comprised in a wireless communication network 100. Such wireless communication network 100 may be based on LTE. Further, the wireless communication system 100 may be based on FDD or TDD in different embodiments.

The receiver 120 comprises a receiving circuit 810, configured to receive a data packet from the transmitter 110.

Further, the receiver 120 comprises a first memory 840, configured to store successfully decoded data packets in chronological order of reception.

The first memory 840 may comprise a physical device utilised to store data or programs, i.e., sequences of instructions, on a temporary or permanent basis. According to some embodiments, the first memory 840 may comprise integrated circuits comprising silicon-based transistors. Further, the first memory 840 may be volatile or non-volatile. The first memory 840 may sometimes also be referred to as a reception buffer.

In addition, the receiver 120 comprises a second memory 850, configured to store unsuccessfully decoded data packets in chronological order of reception.

The second memory 850 may comprise a physical device utilised to store data or programs, i.e., sequences of instructions, on a temporary or permanent basis. According to some embodiments, the second memory 850 may comprise integrated circuits comprising silicon-based transistors. Further, the second memory 850 may be volatile or non-volatile. The second memory 850 may sometimes also be referred to as a reception buffer for failed transmissions.

The receiver 120 also comprises a processor 820. The processor 820 is configured to determine if the received data packet is a retransmission or a new transmission. The processor 820 is also configured to combine the received data packet with the oldest unsuccessfully decoded data packet stored in the second memory 850 when the received data packet is determined to be a retransmission. In addition, the processor 820 is furthermore configured to decode the received data packet when it is determined to be a new transmission, or decode the combined data packet and the oldest unsuccessfully decoded data packet stored in the second memory 850 when the received data packet is determined to be a retransmission. The processor 820 is additionally configured to check if the decoding of the data packet is successful. Also, the processor 820 is configured to store the decoded data packet in the first memory 840 when the decoding of the data packet is successful and store the data packet in the second memory 850 when the decoding fails.

Such processor 820 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

The processor 820 may in some embodiments be configured to combine the received data packet with the oldest unsuccessfully decoded data packet stored in the second memory 850 by MRC, when the received data packet is determined to be a retransmission.

The processor 820 may in some embodiments be configured to decode the received data packet without making any combination with the oldest unsuccessfully decoded data packet stored in the second memory 850, when the received data packet is determined to be a retransmission and the decoding of the received data packet is unsuccessful.

Furthermore, the processor 820 may be configured to compare the received data packet with the last stored successfully received data packet in the first memory 840 when the received data packet is determined to be a retransmission and is successfully decoded; and also configured to discard the decoded data and transmit an ACK, via the transmitting circuit 830, when the comparison confirms that the decoded data packet has already been received.

The processor 820 may further be configured to determine if the received data packet is a retransmission or a new transmission, based on an NDI received together with the data packet.

The receiver 120 also comprises a transmitting circuit 830, configured to transmit feed-back information to the transmitter 110, concerning the successfulness in decoding the data packet.

The transmitting circuit 830 may be configured to transmit feed-back information comprising an ACK when the decoding of the received data packet is successful, and otherwise not transmitting any feed-back information.

However, in some embodiments the transmitting circuit 830 may be configured to transmit feed-back information comprising an ACK when the decoding of the received data packet is successful, and otherwise transmitting a NACK.

Thus, in some embodiments, a NACK may be transmitted when the received data packet is not correctly decoded, or when an expected data packet is not received, while in some embodiments, nothing is transmitted back to the transmitter when the received data packet is not correctly decoded, or when an expected data packet is not received.

The actions 701-711 to be performed in the receiver 120 may be implemented through the one or more processors 820 in the receiver 120 together with computer program product for performing the functions of the actions 701-711.

Thus a computer program comprising program code for performing the method 700 according to any of actions 701-711, may be performed when the computer program is loaded in the processor 820.

The computer program product mentioned above may be provided for instance in the form of a data carrier carrying computer program code for performing at least some of the actions 701-711 according to some embodiments when being loaded into the processor 820. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the receiver 120, e.g., over an Internet or an intranet connection.

Figure 9A:
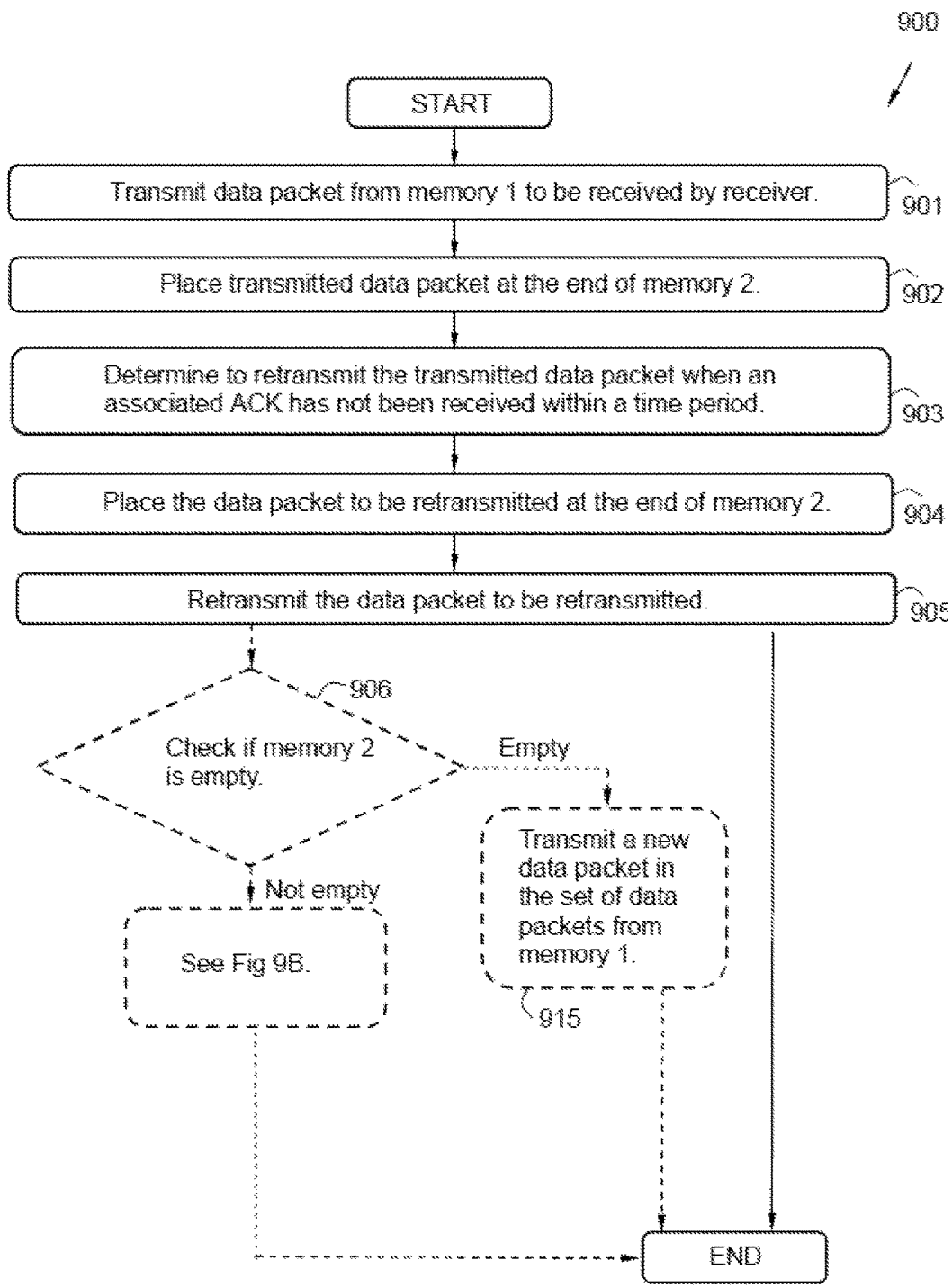
FIG. 9A is a flow chart illustrating a part of a method in a transmitter according to an embodiment.
Figure 9B:
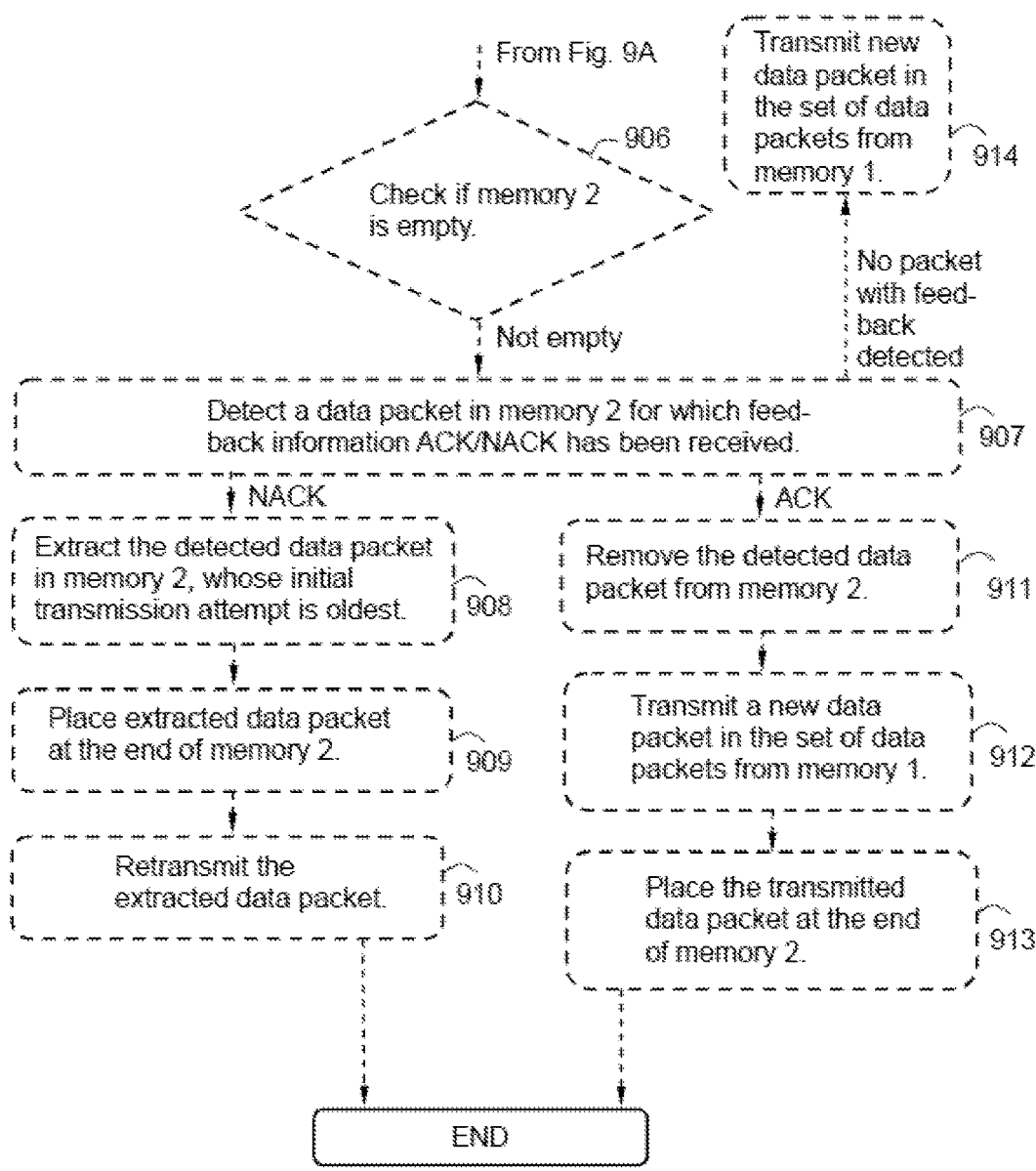
FIG. 9B is a flow chart illustrating a part of a method in a transmitter according to an embodiment.

FIG. 9A and FIG. 9B illustrate a flow chart of an embodiment of a method 900 in a transmitter 110, for transmitting a set of data packets to a receiver 120.

The receiver 120 may comprise a UE while the transmitter 110 may comprise a network node such as an eNodeB in some embodiments. In other embodiments, the situation may be the opposite, i.e. the receiver 120 may comprise a network node such as an eNodeB while the transmitter 110 comprise a UE. The transmitter 110 and the receiver 120 may be comprised in a wireless communication network 100. Such wireless communication network 100 may be based on LTE. Further, the wireless communication system 100 may be based on FDD or TDD in different embodiments.

To appropriately transmit the set of data packets to the receiver 120, the method 900 may comprise a number of actions 901-915.

It is however to be noted that any, some or all of the described actions 901-915, may be performed in a somewhat different chronological order than the enumeration indicates, be performed simultaneously or even be performed in a completely reversed order according to different embodiments. Some actions may be performed within some alternative embodiments such as e.g. action 906, 907, 908, 909, 910 and/or 911. Further, it is to be noted that some actions may be performed in a plurality of alternative manners according to different embodiments, and that some such alternative manners may be performed only within some, but not necessarily all embodiments. The method 900 may comprise the following actions:

Action 901 comprises transmitting a data packet from a first memory, to be received by the receiver 120.

Action 902 comprises placing the transmitted 901 data packet at the end of a second memory.

Action 903 comprises determining to retransmit the transmitted 901 data packet when an ACK associated with the transmitted 901 data packet has not been received from the receiver 120 within a predetermined time period.

Action 904 comprises placing the data packet determined 903 to be retransmitted at the end of a second memory.

Action 905 comprises retransmitting the data packet determined 903, to be retransmitted.

Action 906 may only be performed within some embodiments. The optional action 906 comprises checking if the second memory is empty.

Action 907 may only be performed within some embodiments wherein the second memory is not empty, according to a performed check 906. The optional action 907 comprises detecting a data packet in the second memory for which feed-back information has been received from the receiver 120.

Action 908 may only be performed within some embodiments, wherein a data packet with negative feed-back has been detected 907. The optional action 908 comprises extracting the detected 907 data packet in the second memory, whose initial transmission attempt is oldest.

Action 909 may only be performed within some embodiments wherein action 908 has been performed. The optional action 909 comprises placing the extracted 908 data packet at the end of the second memory.

Action 910 may only be performed within some embodiments wherein action 908 has been performed. The optional action 910 comprises retransmitting the extracted 908 data packet.

Action 911 may only be performed within some embodiments wherein a data packet with positive feed-back has been detected 907. The optional action 911 comprises removing the detected 907 data packet from the second memory.

Action 912 may only be performed within some embodiments. The optional action 912 comprises transmitting a new data packet in the set of data packets from first memory 1040, to be received by the receiver 120.

Action 913 may only be performed within some embodiments. The optional action 913 comprises placing the transmitted 912 data packet at the end of the second memory.

Action 914 may only be performed within some embodiments when no packet with feed-back has been detected 907. The optional action 914 comprises transmitting a new data packet in the set of data packets from the first memory 1040, to be received by the receiver 120.

Action 915 may only be performed within some embodiments when the second memory is empty. The optional action 915 comprises transmitting a new data packet in the set of data packets from first memory 1040, to be received by the receiver 120.

Figure 10:
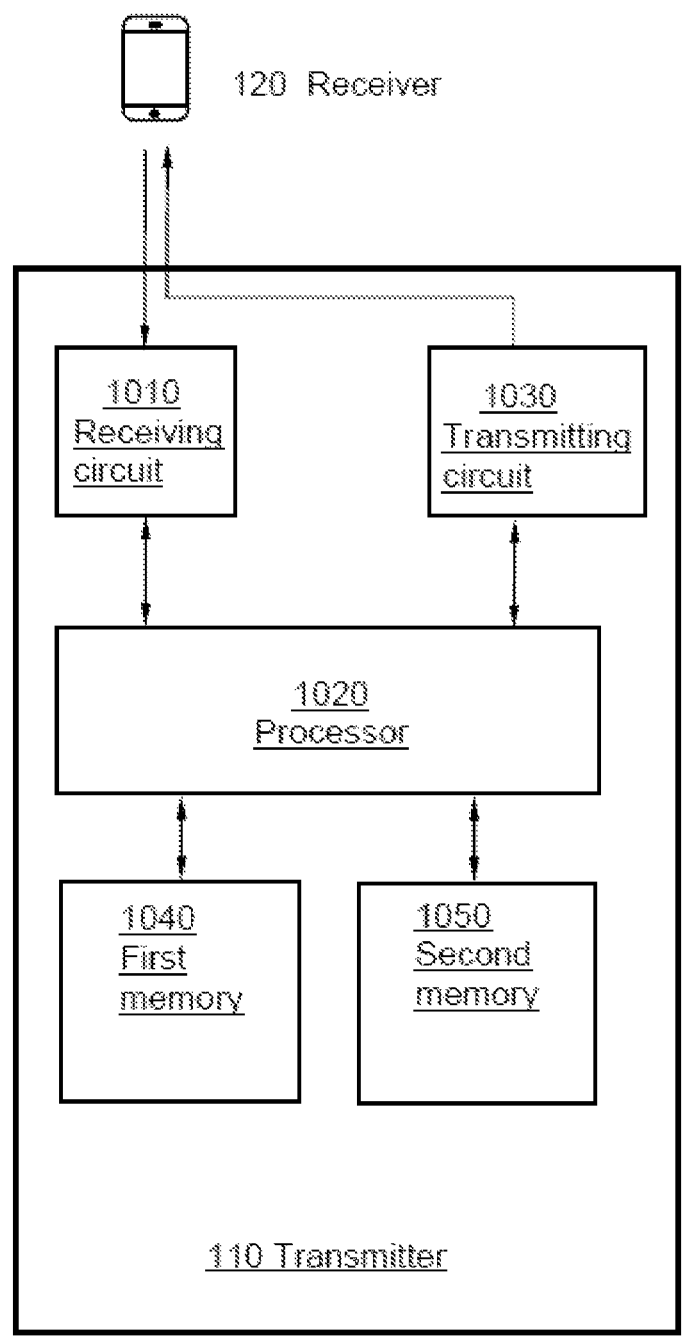
FIG. 10 is a block diagram illustrating a transmitter according to an embodiment.

FIG. 10 illustrates an embodiment of a transmitter 110. The transmitter 110 is configured for transmitting a set of data packets, to be received by a receiver 120, by performing the method 900 according to at least some of the actions 901-915.

The receiver 120 may comprise a UE while the transmitter 110 may comprise a network node such as an eNodeB in some embodiments. In other embodiments, the situation may be the opposite, i.e. the receiver 120 may comprise a network node such as an eNodeB while the transmitter 110 comprise a UE. The transmitter 110 and the receiver 120 may be comprised in a wireless communication network 100. Such wireless communication network 100 may be based on LTE. Further, the wireless communication system 100 may be based on FDD or TDD in different embodiments.

The transmitter 110 comprises a transmitting circuit 1030 configured to transmit a data packet, to be received by the receiver 120. The transmitting circuit 1030 is also configured to retransmit the data packet determined to be retransmitted.

Further, the transmitter 110 comprises a first memory 1040, configured to store new data packets arriving to the transmitter 110. The first memory 1040 may comprise a physical device utilised to store data or programs, i.e., sequences of instructions, on a temporary or permanent basis. According to some embodiments, the first memory 1040 may comprise integrated circuits comprising silicon-based transistors. Further, the first memory 1040 may be volatile or non-volatile. The first memory 1040 may sometimes also be referred to as a transmission buffer.

The transmitter 110 also comprises a second memory 1050, configured to store transmitted data packets for potential future retransmission. The second memory 1050 may comprise a physical device utilised to store data or programs, i.e., sequences of instructions, on a temporary or permanent basis. According to some embodiments, the second memory 1050 may comprise integrated circuits comprising silicon-based transistors. Further, the second memory 1050 may be volatile or non-volatile. The second memory 1050 may sometimes also be referred to as a reception buffer for failed transmissions.

The transmitter 110 also comprises a processor 1020. The processor 1020 is configured to determine to retransmit the transmitted data packet when an ACK associated with the transmitted data packet has not been received from the receiver 120 within a predetermined time period. The processor 1020 is also configured to place the data packet determined to be retransmitted at the end of the second memory 1050.

Such processor 1020 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

Such processor 1020 may further be configured to check if the second memory 1050 is empty, and, when the second memory 1050 is not empty: to detect a data packet in the second memory 1050 for which negative feed-back information has been received from the receiver 120. In addition in some embodiments, the processor may be configured to extract the detected data packet in the second memory 1050, whose initial transmission attempt is oldest.

Also, the transmitter 1030 may be further configured to retransmit the extracted data packet when the second memory 1050 is not empty; and otherwise, when the second memory 1050 is empty: to transmit a new data packet in the set of data packets from a first memory 1040, to be received by the receiver 120.

The actions 901-915 to be performed in the transmitter 110 may be implemented through the one or more processors 1020 in the transmitter 110 together with computer program product for performing the functions of the actions 901-915.

Thus a computer program comprising program code for performing the method 900 according to any of actions 901-915, may be performed when the computer program is loaded in the processor 1020.

The computer program product mentioned above may be provided for instance in the form of a data carrier carrying computer program code for performing at least some of the actions 901-915 according to some embodiments when being loaded into the processor 1020. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the transmitter 110, e.g., over an Internet or an intranet connection.

The terminology used in the description of the embodiments as illustrated in the accompanying drawings is not intended to be limiting of the described methods 700, 900 and/or transmitter 110 and/or receiver 120. Various changes, substitutions and/or alterations may be made, without departing from the invention as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

What is claimed is:

1. A receiver comprising:
a receiving circuit, configured to receive a data packet from a transmitter;
a first memory, configured to store successfully decoded data packets;
a second memory, configured to store unsuccessfully decoded data packets; and
a processor configured to:
determine if the received data packet is a retransmission or a new transmission;
combine the received data packet with the oldest unsuccessfully decoded data packet stored in the second memory when the received data packet is determined to be a retransmission;
decode the received data packet when it is determined to be a new transmission, or decode the data packet combined with the oldest unsuccessfully decoded data packet stored in the second memory when it is determined to be a retransmission;
check if the decoding of the data packet is successful; and
store the decoded data packet in the first memory when the decoding of the data packet succeeded and in the second memory when the decoding is unsuccessful;

wherein the receiver further comprises a transmitting circuit, configured to transmit feed-back information to the transmitter, concerning the successfulness in decoding the data packet, wherein the determining if the received data packet is a retransmission or a new transmission is based on a New Data Indication (NDI) received together with the data packet.

2. The receiver according to claim 1, wherein the processor is configured to combine the received data packet with the oldest unsuccessfully decoded data packet stored in the second memory by Maximum-Ratio Combining (MRC) when the received data packet is determined to be a retransmission.

3. The receiver according to claim 1, wherein the transmitting circuit is configured to transmit feed-back information comprising a positive Acknowledgment (ACK) when the decoding of the received data packet is successful, and otherwise not transmitting any feed-back information.

4. The receiver according to claim 1, wherein the transmitting circuit is configured to transmit feed-back information comprising an ACK when the decoding of the received data packet is successful, and otherwise transmitting a Non-Acknowledgement (NACK).

5. The receiver according to claim 1, wherein the processor is configured to decode the received data packet without any combination with the oldest stored unsuccessfully decoded data packet in the second memory, when the received data packet is determined to be a retransmission and the decoding of the combined data packet is unsuccessful.

6. The receiver according to claim 1, wherein the processor is configured to compare the received data packet with the last stored successfully received data packet in the first memory when the received data packet is determined to be a retransmission and is successfully decoded; and also configured to discard the received data packet and transmit an ACK, via the transmitting circuit, when the comparison confirms that said data packet already has been received.

7. A method in a receiver for receiving a set of data packets from a transmitter, wherein the method comprises:
   receiving a data packet;
   determining if the received data packet is a retransmission or a new transmission;
   when the received data packet is determined to be a retransmission, combining the received data packet with oldest unsuccessfully decoded data packet stored in a second memory;
   decoding the received data packet when it is determined to be a new transmission, or decoding the data packet combined with the oldest unsuccessfully decoded data packet stored in the second memory when it is determined to be a retransmission;
   checking if the decoding of the data packet is successful;
   deleting the oldest stored data packet in the first memory;
   storing the decoded data packet in the first memory when the checking of the decoding is successful or storing the decoded data packet in the second memory when the checking of the decoding is not successful; and
   transmitting feed-back information to the transmitter, concerning the successfulness in decoding said data packet,
   wherein the determining if the received data packet is a retransmission or a new transmission is based on a New Data Indication (NDI) received together with the data packet.

8. A non-transitory computer readable storage medium storing instructions executable by a computing system for receiving a set of data packets from a transmitter, when executed by the computing system, the instructions cause the computing system to perform steps comprising:
   receiving a data packet;
   determining if the received data packet is a retransmission or a new transmission;
   when the received data packet is determined to be a retransmission, combining the received data packet with oldest unsuccessfully decoded data packet stored in a second memory;
   decoding the received data packet when it is determined to be a new transmission, or decoding the data packet combined with the oldest unsuccessfully decoded data packet stored in the second memory when it is determined to be a retransmission;
   checking if the decoding of the data packet is successful;
   deleting the oldest stored data packet in the first memory;
   storing the decoded data packet in the first memory when the checking of the decoding is successful or storing the decoded data packet in the second memory when the checking of the decoding is not successful; and
   transmitting feed-back information to the transmitter, concerning the successfulness in decoding said data packet,
   wherein the determining if the received data packet is a retransmission or a new transmission is based on a New Data Indication (NDI) received together with the data packet.

* * * * *